US007076538B2

(12) United States Patent
Cromer et al.

(10) Patent No.: US 7,076,538 B2
(45) Date of Patent: Jul. 11, 2006

(54) METHOD AND SYSTEM FOR DISGUISING A COMPUTER SYSTEM'S IDENTITY ON A NETWORK

(75) Inventors: Daryl Carvis Cromer, Apex, NC (US); Richard Alan Dayan, Wake Forest, NC (US); Eric Richard Kern, Durham, NC (US); Randall Scott Springfield, Chapel Hill, NC (US); Joseph Wayne Freeman, Raleigh, NC (US); Robert Duane Johnson, Raleigh, NC (US); Brandon Jon Ellison, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 694 days.

(21) Appl. No.: 09/759,953

(22) Filed: Jan. 12, 2001

(65) Prior Publication Data

US 2002/0161994 A1     Oct. 31, 2002

(51) Int. Cl.
*G06F 15/16* (2006.01)
(52) U.S. Cl. ............. 709/221; 709/225; 709/220; 709/223; 709/224; 709/226; 380/255; 380/274; 380/43; 380/277; 380/44; 380/221; 380/259
(58) Field of Classification Search ......... 380/255, 380/274, 43, 277, 44, 221, 259; 709/220–222, 709/223–226
See application file for complete search history.

(56) References Cited

U.S. PATENT DOCUMENTS 5,729,537 A  3/1998 Billstrom 5,913,217 A *  6/1999 Alger et al. ............... 707/101
5,953,419 A     9/1999 Lohstroh et al.
5,961,593 A * 10/1999 Gabber et al. ............. 709/219
6,058,311 A *  5/2000 Tsukagoshi ............. 455/435.1

FOREIGN PATENT DOCUMENTS

EP    0899918 A2    3/1999

OTHER PUBLICATIONS

Claessens, Joris et al. "Solutions for Anonymous Communication on the Internet", Proceedings of the IEEE 33rd Annual 1999 International Carnahan Conference on Security Technology, Oct. 5-7, 1999, pp 298-303.*

* cited by examiner

*Primary Examiner*—Ramesh Patel
*Assistant Examiner*—Thomas Pham
(74) *Attorney, Agent, or Firm*—Carlos Munoz-Bustamante; Dillon & Yudell LLP

(57) ABSTRACT

A method and system are disclosed for substituting an anonymous Universal Unique Identifier (UUID) for a computer system's real UUID in order to disguise an identity of the computer system to an application which is requesting a UUID for the client computer system. A storage device is established in the computer system. The storage device includes a primary and a second location. A UUID stored in the primary location is used as a UUID for the computer system. An anonymous UUID is generated. The anonymous UUID does not identify any particular computer system. The anonymous UUID is stored in the primary location within the storage device, and the real UUID is backed up by moving it into the secondary location. Thereafter, the anonymous UUID is provided in response to requests for the computer system's UUID.

8 Claims, 4 Drawing Sheets

METHOD AND SYSTEM FOR DISGUISING A COMPUTER SYSTEM'S IDENTITY ON A NETWORK

CROSS-REFERENCE TO RELATED APPLICATIONS

The present invention is related to the subject matter of co-pending patent application Ser. No. 09/759,936 entitled "METHOD AND SYSTEM FOR DISGUISING A COMPUTER SYSTEM'S IDENTITY ON A NETWORK BY DISGUISING THE SYSTEM'S MAC ADDRESS", assigned to the assignee herein named, filed on Jan. 12, 2001 and incorporated herein by reference.

BACKGROUND OF THE INVENTION

1. Field of the Invention

The present invention relates in general to data processing systems and, in particular, to a data processing system and method for disguising a computer's identity. Still more particularly, the present invention relates to a data processing system and method for disguising a computer's identity by utilizing an anonymous UUID instead of the computer system's real UUID.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

A computer system requires a basic input/output system (BIOS) in order to operate. The BIOS is code that controls basic hardware operations, such as interactions with disk drives, hard drives, and the keyboard.

When a computer is reset, the computer system is initialized. When the initialization is complete, a boot process begins when POST begins executing. POST uses the initialization settings to configure the computer. BIOS then controls the basic operation of the hardware utilizing the hardware as it was configured by POST. The boot process is complete upon the completion of the execution of the POST commands.

Each computer system includes a Universal Unique Identifier (UUID). The UUID is a 16-byte number which is unique for each computer system. The UUID is a part of the computer system and is a standard way to identifier particular computer systems. The UUID is programmed into the computer system during the manufacture of the computer system. There are standard calls to allow application programs to access the UUID.

The Internet is revolutionizing the way many people live their lives from shopping to seeking entertainment and information. However, there is a disadvantage to using the Internet. A user loses his/her privacy when the UUID of each computer system accessing the Internet is tracked. For example, a merchant could track which users are using the merchant's services by tracking the UUID of each computer system which accesses the merchant's Internet site.

Currently, in order for a user to remain anonymous when accessing entertainment and conducting transactions, the user must conduct the transactions and access entertainment without using the Internet. For example, a user can pay for merchandise using cash. Reading a newspaper or watching broadcast television will not result in others learning what articles the user reads or program which the user watches.

Therefore a need exists for a data processing system and method for disguising an identity of a computer system.

SUMMARY OF THE INVENTION

A method and system are disclosed for substituting an anonymous Universal Unique Identifier (UUID) for a computer system's real UUID in order to disguise an identity of the computer system to an application which is requesting a UUID for the client computer system. A storage device is established in the computer system. The storage device includes primary and second locations. A UUID stored in the primary location is used as a UUID for the computer system. An anonymous UUID is generated. The anonymous UUID does not identify any particular computer system. The anonymous UUID is stored in the primary location within the storage device, and the real UUID is backed up by moving it into the secondary location. Thereafter, the anonymous UUID is provided in response to requests for the computer system's UUID.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for substituting an anonymous UUID for a computer system's real UUID address in order to disguise the identity of the computer system. The computer system includes a storage device having a primary location and a secondary location. The primary location is used for storing a UUID. When the computer system receives a request for its UUID, it will report the value currently stored in the primary location. The secondary location is used when the identity of the computer is to be disguised. When the identity of the computer is to be disguised, the real UUID currently stored in the primary location is moved from the primary location into the secondary location. An anonymous UUID is then stored in the primary location. Thereafter, when the computer provides its UUID, it will provide the anonymous UUID.

When the client is to again represent its true identity, the real UUID which is now stored in the secondary location is copied from the secondary location back into the primary location. The client system is then reset.

In order to determine whether to disguise a computer system's real UUID, a cloaking bit is used which is included in the CMOS. When the cloaking bit is set, the UUID stored in the primary location is copied to the secondary location so that an UUID can be subsequently stored in the primary storage device. When the cloaking bit is cleared, the address stored in the secondary location is restored to the primary location so that the real UUID can be used.

Figure 1:
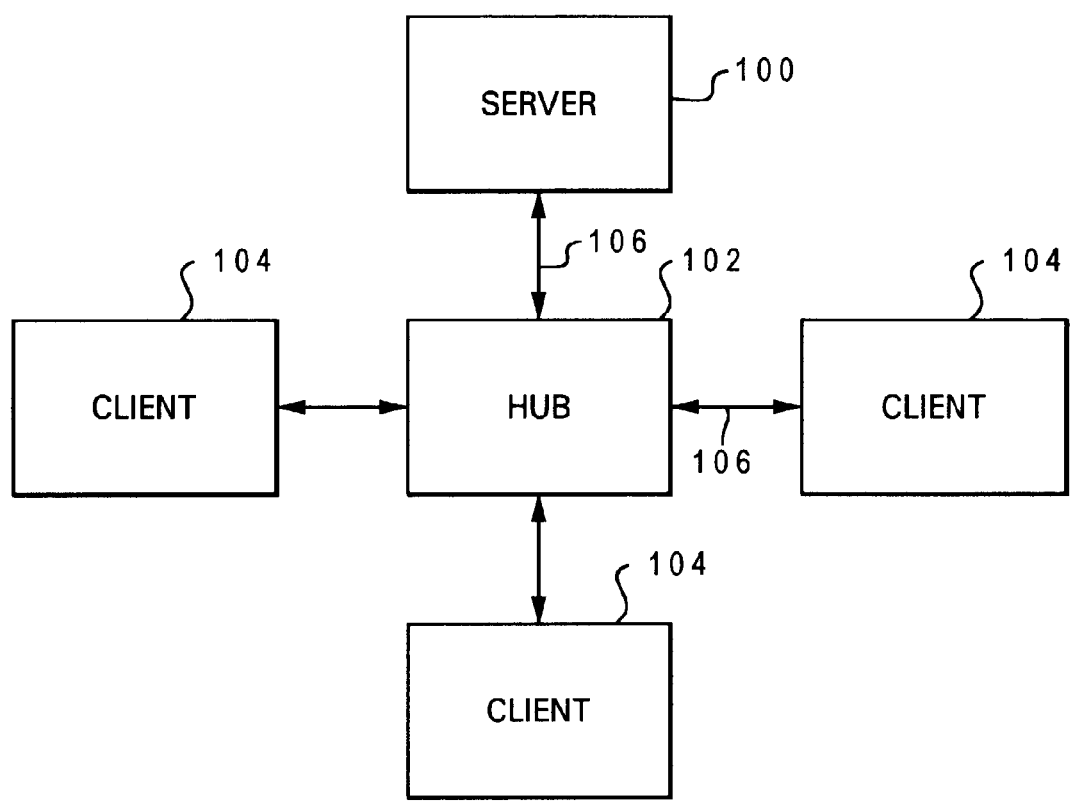
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a network including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client computer systems 104 also connect to hub 102 through respective LAN busses 106. The preferred form of the network conforms to the Ethernet specification and uses such hubs and busses. It will be appreciated, however, that other forms of networks may be utilized to implement the invention.

Figure 2:
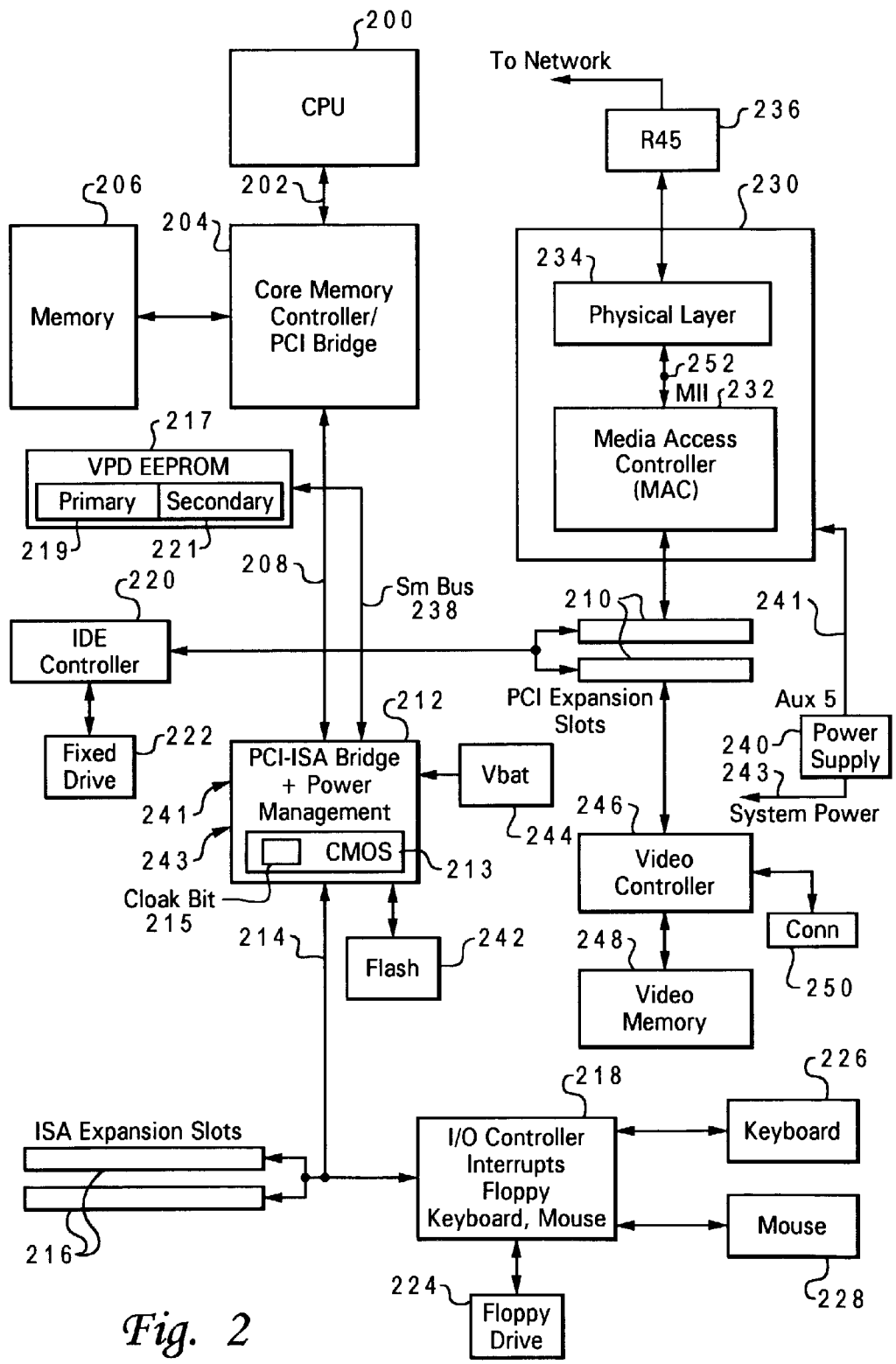
FIG. 2 depicts a more detailed pictorial representation of either a client or server computer system in accordance with the method and system of the present invention.

FIG. 2 depicts a more detailed pictorial representation of either a client or a server computer system in accordance with the method and system of the present invention. Client computer system 104 includes a planar 201 (also commonly called a motherboard or system board) which is mounted within client 104 and provides a means for mounting and electrically interconnecting various components of client 104 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A cloak bit 215 is included within CMOS 213. Cloak bit 215 is utilized to determine whether the real MAC address should be disguised. When cloak bit 215 is set, the real MAC address assigned to MAC 232 by the IEEE will be disguised. When cloak bit 215 is cleared, the real MAC address assigned to MAC 216 will be transmitted.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Client computer system 104 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 104 through connector 250.

Computer system 104 includes a power supply 240 which supplies full normal system power 243, and has an auxiliary power main AUX 5 241 which supplies full time power to the power management logic 212 and to network adapter 230.

In accordance with the present invention, a storage device 217 is coupled to PCI-ISA bridge 212 utilizing a system management (SM) bus 238. Preferably, storage device 217 is implemented utilizing an electronically erasable storage device, such as an EEPROM. At the time computer system 104 is manufactured, the real UUID which identifies this computer system is stored in primary location 219 of storage device 217. System management bus 238 is a two-wire, low speed, serial bus used to interconnect management and monitoring devices. Those skilled in the art will recognize that storage device 217 may be coupled to another bus within planar 201.

The current setting of the cloak bit 215 is detected during POST. When cloak bit 215 is set, the UUID stored in primary location 219 is moved into secondary location 221. An anonymous UUID is then created, such as by scrambling the real UUID, zeroing-out the UUID, or storing a new UUID.

Thereafter, when the UUID is requested, the anonymous UUID will be reported. The anonymous UUID is reported until the cloak bit is cleared. When the cloak bit is detected during POST as being cleared after just previously being set, the real UUID currently stored in secondary location 221 will be moved back into primary location 219. Thereafter, when the UUID is requested, the real UUID will be reported. The real UUID is reported until the cloak bit is again set.

Client 104 also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

Network adapter 230 may be plugged into one of the PCI connector slots 210 (as illustrated) or one of the ISA connector slots 216 in order to permit client 104 to communicate with server 100 utilizing a communication link 106. MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with the address of MAC 232, and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236. Physical layer 234 is also responsible for wave shaping and provides analog voltages. In a preferred embodiment, physical layer 234 is implemented utilizing an Integrated Services chip ICS-1890.

Physical layer 234 includes auto-negotiation logic that serves three primary purposes. First, it determines the capabilities of client 104. Second, it advertises its own capabilities to server 100. And, third, it establishes a connection with server 100 using the highest performance connection technology.

Figure 3:
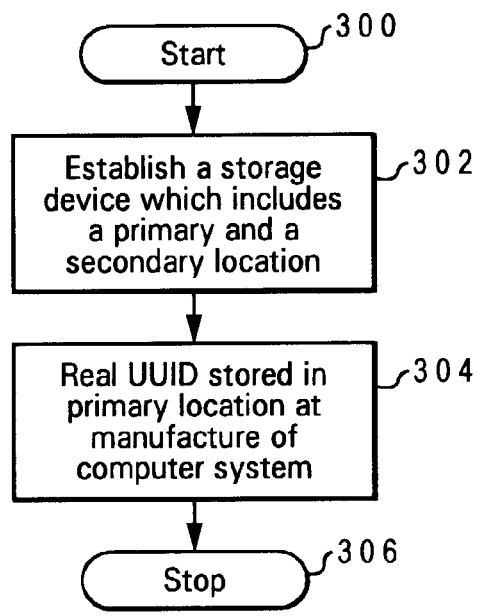
FIG. 3 illustrates a high level flow chart which depicts storing a real UUID in a primary location in a storage device in accordance with the method and system of the present invention.

FIG. 3 illustrates a high level flow chart which depicts storing a real UUID in a primary location in a storage device in accordance with the method and system of the present invention. The process starts as depicted by block 300 and thereafter passes to block 302 which illustrates establishing a storage device 217 within a computer system. The storage device is preferably a vital product data (VPD) EEPROM. The storage device includes a primary location 219 and a secondary location 221. Next, block 304 depicts the real UUID assigned to this particular computer system being stored in primary location 219 at the time the computer system is manufactured. Thereafter, whenever the UUID for this computer system is requested, the computer system will report whatever value is currently stored in primary location 219 as being the real UUID for the computer system. The process then terminates as illustrated by block 306.

Figure 4:
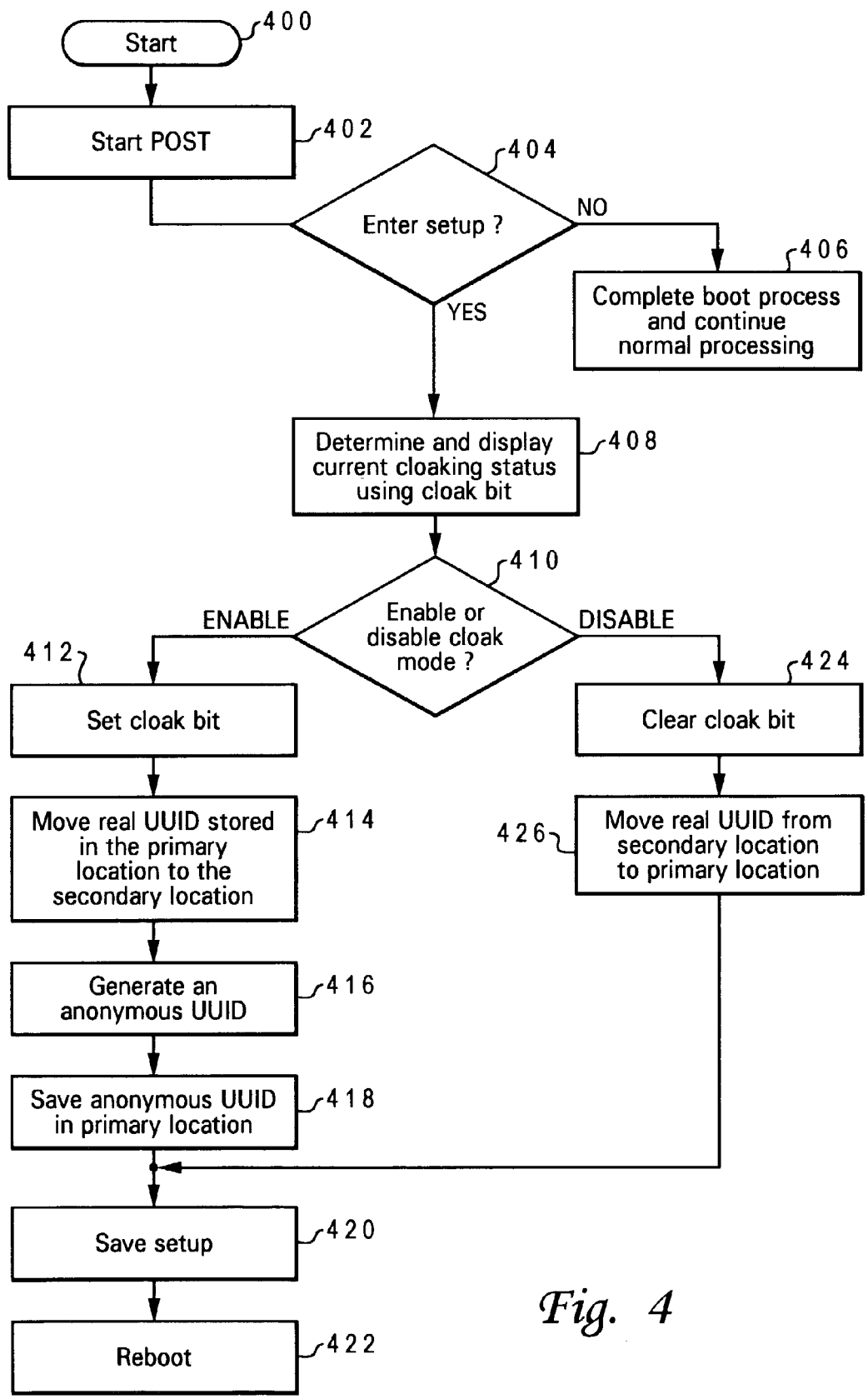
FIG. 4 depicts a high level flow chart which illustrates moving the real UUID and anonymous UUID between primary and secondary locations according to the current setting of a cloaking bit in accordance with the method and system of the present invention.

FIG. 4 depicts a high level flow chart which illustrates moving the real UUID and anonymous UUID between primary and second locations according to the current setting of a cloaking bit in accordance with the method and system of the present invention. The process starts as depicted at block 400 and thereafter passes to block 402 which illustrates starting the execution of POST. Next, block 404 depicts a determination of whether or not a user has entered SETUP. If a determination is made that the user has not entered SETUP, the process passes to block 406 which illustrates completing the boot process to boot the computer system and the continuation of normal processing.

Referring again to block 404, if a determination is made that the user has entered SETUP, the process passes to block 408 which depicts a determination and displaying of a current cloaking status for the computer system using cloak bit 215. Next, block 410 illustrates a determination of whether to enable or disable cloaking. If a determination is made to enable cloaking, the process passes to block 412 which depicts setting cloak bit 215. The process then passes to block 414 which illustrates moving the real UUID currently stored in primary location 219 storage device 217 to secondary location 221 in storage device 217. Thereafter, block 416 depicts generating an anonymous UUID. The anonymous UUID may be generated using one of several different methods. For example, the time stamp in the UUID could be replaced with the current time, thus creating a UUID which is different from the real UUID. In another method, the real UUID could be replaced with a random number. Next, block 418 illustrates saving the anonymous UUID in secondary storage 221. The process then passes to block 420 which depicts saving SETUP. Block 422, then, depicts resetting and rebooting the computer system.

Referring again to block 410, if a determination is made to disable cloaking, the process passes to block 424 which illustrates clearing cloak bit 215. Thereafter, block 426 illustrates moving the real UUID from secondary location 221 to primary location 219. The process then passes to block 420.

Figure 5:
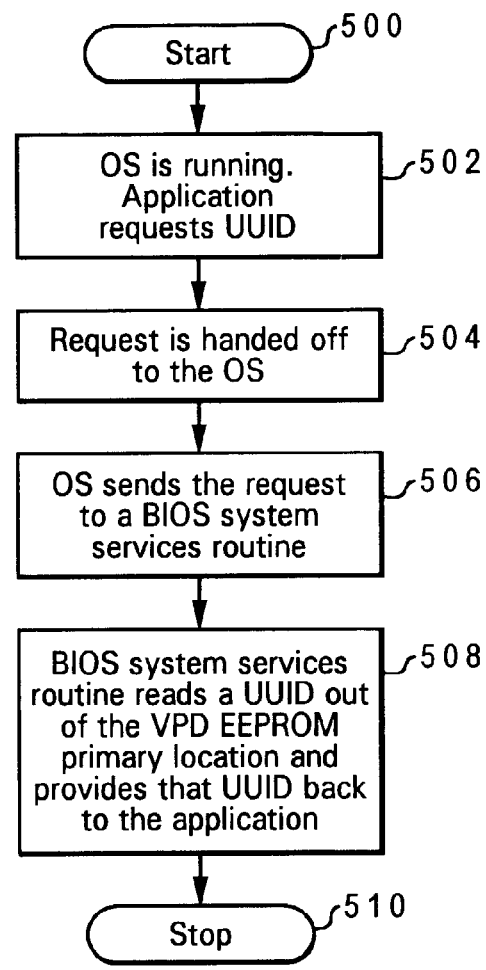
FIG. 5 illustrates a high level flow chart which depicts a computer system reporting a UUID to a requesting application in accordance with the method and system of the present invention.

FIG. 5 illustrates a high level flow chart which depicts a computer system reporting a UUID to a requesting application in accordance with the method and system of the present invention. The process starts as depicted by block 500 and thereafter passes to block 502 which illustrates the computer system executing an operating system (OS). An application program also being executed by the computer system requests the computer system's UUID. Next, block 504 depicts the application program handing the request off to the operating system. Thereafter, block 506 illustrates the operating system sending the request to a BIOS system services routine. Block 508, then, depicts the BIOS system services routine reading a UUID currently stored in primary location 219 of storage device 217 and providing that UUID as the UUID of the computer system. If the cloaking bit is set, the UUID read from primary location 219 will be the anonymous UUID. If the cloaking bit is cleared, the UUID read from primary location 219 will be the real UUID which correctly identifies this particular computer system. The process then terminates as depicted by block 510.

While a preferred embodiment has been particularly shown and described, it will be understood by those skilled in the art that various changes in form and detail may be made therein without departing from the spirit and scope of the present invention.

What is claimed is:

1. A method for substituting an anonymous Universal Unique Identifier (UUID) for a computer system's real UUID) in order to disguise an identity of said computer system to an application requesting a UUID for said client computer system, said method comprising the steps of:

establishing a cloak bit for specifying whether to disguise said computer system's identity;

establishing a storage device in said computer system including a primary location, wherein a UUID stored in said primary location is used as a UUID for said computer system;

determining whether said cloak bit is set or cleared;

generating an anonymous UUID in response to a determination that said cloak bit is set, wherein said anonymous UUID does not identify any particular computer system;

moving said real UUID to a secondary location within said storage device; and providing said anonymous UUID in response to a request for said computer system's UUID.

2. The method according to claim 1, further comprising the steps of:

said computer system starting execution of said boot process;

determining whether said cloak bit is set during said execution of said boot process; and in response to a determination that said cloak bit is set, moving said real UUID stored in said primary location to a secondary location in said storage device and storing said anonymous UUID in said primary location, wherein said identity of said computer system is disguised by utilizing said anonymous UUID as said client computer system's UUID.

3. The method according to claim 2, further comprising the step of in response to a determination that said cloak bit is cleared, moving said real UUID from said storage location to said primary location, wherein a true identity of said computer system is represented by utilizing said real UUID as said computer system's UUID.

4. The method according to claim 1, further comprising the steps of:

an application program requesting said computer system's UUID; and said computer system providing a UUID stored in said primary location to said application program in response to said request.

5. A system for substituting an anonymous Universal Unique Identifier (UUID) for a computer system's real UUID in order to disguise an identity of said computer system to an application requesting a UUID for said client computer system, said computer system including a CPU, comprising:

a cloak bit for specifying whether to disguise said computer system's identity;

a storage device in said computer system including a primary location, wherein a UUID stored in said primary location is used as a UUID for said computer system;

means for determining whether said cloak bit is set or cleared;

means for generating said anonymous UUID in response to a determination that said cloak bit is set, wherein said anonymous UUID does not identify any particular computer system;

means for storing said anonymous UUID in said primary location within said storage device and for moving said real UUID to a secondary location within said storage device; and said system for providing said anonymous UUID in response to a request for said computer system's UUID.

6. The system according to claim 5, further comprising:

means for starting execution of said boot process;

means for determining whether said cloak bit is set during said execution of said boot process; and in response to a determination that said cloak bit is set, means for moving said real UUID stored in said primary location to a secondary location in said storage device and storing said anonymous UUID in said primary location, wherein said identity of said computer system is disguised by utilizing said anonymous UUID as said client computer system's UUID.

7. The system according to claim 6, further comprising in response to a determination tat said cloak bit is cleared, means for moving said real UUID from said secondary location to said primary location, wherein a true identity of said computer system is represented by utilizing said real UUID as said computer system's UUID.

8. The system according to claim 5, further comprising:

an application program for requesting said computer system's UUID; and means for providing a UUID stored in said primary location to said application program in response to said request.

* * * * *